US008411654B2

(12) United States Patent
Loc et al.

(10) Patent No.: US 8,411,654 B2
(45) Date of Patent: Apr. 2, 2013

(54) AUTONOMOUS WIRELESS COMMUNICATION SYSTEM AND METHOD OF USE

(75) Inventors: Peter Loc, Cupertino, CA (US); Chung-Wen Dennis Lo, Palo Alto, CA (US); Pojung Paul Lin, Jhubei (TW)

(73) Assignees: IWT (Innovations in Wireless Technology Inc.), Cupertino, CA (US); Mediatek Inc., Hsin-Chu (TW)

( * ) Notice: Subject to any disclaimer, the term of this patent is extended or adjusted under 35 U.S.C. 154(b) by 525 days.

(21) Appl. No.: 12/626,538

(22) Filed: Nov. 25, 2009

(65) Prior Publication Data

US 2011/0122857 A1      May 26, 2011

(51) Int. Cl.
*H04W 4/00* (2009.01)
(52) U.S. Cl. ........................................................ 370/338
(58) Field of Classification Search ........................ None
See application file for complete search history.

(56) References Cited

U.S. PATENT DOCUMENTS

| | | | |
|---|---|---|---|
| 2005/0229226 A1* | 10/2005 | Relan et al. ................... 725/114 |
| 2006/0215601 A1 | 9/2006 | Vleugels et al. |
| 2006/0288010 A1* | 12/2006 | Chen et al. ......................... 707/9 |
| 2008/0134052 A1* | 6/2008 | Davis et al. ..................... 715/744 |
| 2008/0175199 A1* | 7/2008 | Shao et al. ..................... 370/329 |
| 2009/0100027 A1* | 4/2009 | Malik ............................... 707/3 |
| 2009/0204511 A1* | 8/2009 | Tsang ............................. 705/27 |
| 2009/0232126 A1 | 9/2009 | Cordeiro et al. |
| 2009/0233631 A1* | 9/2009 | Butler et al. .................. 455/466 |
| 2009/0240561 A1* | 9/2009 | Altberg et al. ................. 705/10 |
| 2009/0252178 A1* | 10/2009 | Huttunen et al. ............. 370/445 |
| 2009/0258603 A1 | 10/2009 | Ghaboosi et al. |
| 2009/0305730 A1* | 12/2009 | Herz et al. .................... 455/466 |
| 2010/0302005 A1 | 12/2010 | Popovski |
| 2011/0099623 A1* | 4/2011 | Garrard et al. ................. 726/14 |
| 2012/0163254 A1 | 6/2012 | Stanwood et al. |

* cited by examiner

*Primary Examiner* — John Blanton
(74) *Attorney, Agent, or Firm* — Sawyer Law Group, P.C.

(57) ABSTRACT

An autonomous wireless system is disclosed. The system comprises a plurality of devices. Each of the plurality of devices includes a wireless interface. At least two devices directly communicate with each other through a direct link between the wireless interfaces of the at least two devices. Methods and apparatus for two or more devices equipped with wireless local area network (WLAN) interface to communicate and exchange selected information are disclosed. Accordingly, a system and method in accordance with the present invention enables a handheld, laptop, smart phone or the like, which is equipped with a WLAN interface, to communicate and exchange business contact, sales brochures, event announcements, presentation materials, alert messages, etc., to other devices that include a WLAN interface.

13 Claims, 6 Drawing Sheets

AUTONOMOUS WIRELESS COMMUNICATION SYSTEM AND METHOD OF USE

CROSS-REFERENCE TO RELATED APPLICATIONS

This application is related to U.S. patent application Ser. No. 12/626,532, entitled "AUTONOMOUS WIRELESS COMMUNICATION SYSTEM AND METHOD OF USE," filed concurrently herewith and assigned to the assignees of the present invention; which is incorporated herein by reference in its entirety.

FIELD OF THE INVENTION

The present invention relates generally to wireless systems and more particularly relates to a method and system for allowing for direct communications between devices in such systems.

BACKGROUND

Wireless interfaces are utilized ubiquitously in a variety of devices from cell phones to PDAs to laptop computers. These interfaces are typically wireless local area network (WLAN) interfaces. At the present time a WLAN interface is used to configure and manage the resources of the device. Then, the devices are allowed to communicate via the Internet. This facilitates communication with other individuals, through emails, entities, websites, URLs and the like.

It is desirable to allow for more direct communication between such devices in many types of environments. Accordingly, there is a desire therefore for a system and method to allowing for improved communication between devices that include a wireless interface. This system should be easy to implement, cost effective, and adaptable to existing systems. The present invention addresses such a need.

SUMMARY OF THE INVENTION

Methods and apparatus for two or more devices equipped with wireless local area network (WLAN) interface to communicate and exchange selected information are disclosed. Accordingly, a system and method in accordance with the present invention enables a handheld, laptop, smart phone or the like, which is equipped with a WLAN interface, to communicate and exchange business contacts, sales brochures, event announcements, presentation materials, alert messages, etc., to other devices that include a WLAN interface. Other aspects and advantages of the present invention will become apparent from the following detailed description, taken in conjunction with the accompanying drawings, which illustrate by way of example the principles of the invention.

DETAILED DESCRIPTION OF PREFERRED EMBODIMENTS

The present invention relates generally to wireless systems and more particularly relates to a method and system for allowing for direct communications between devices in such systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1A:
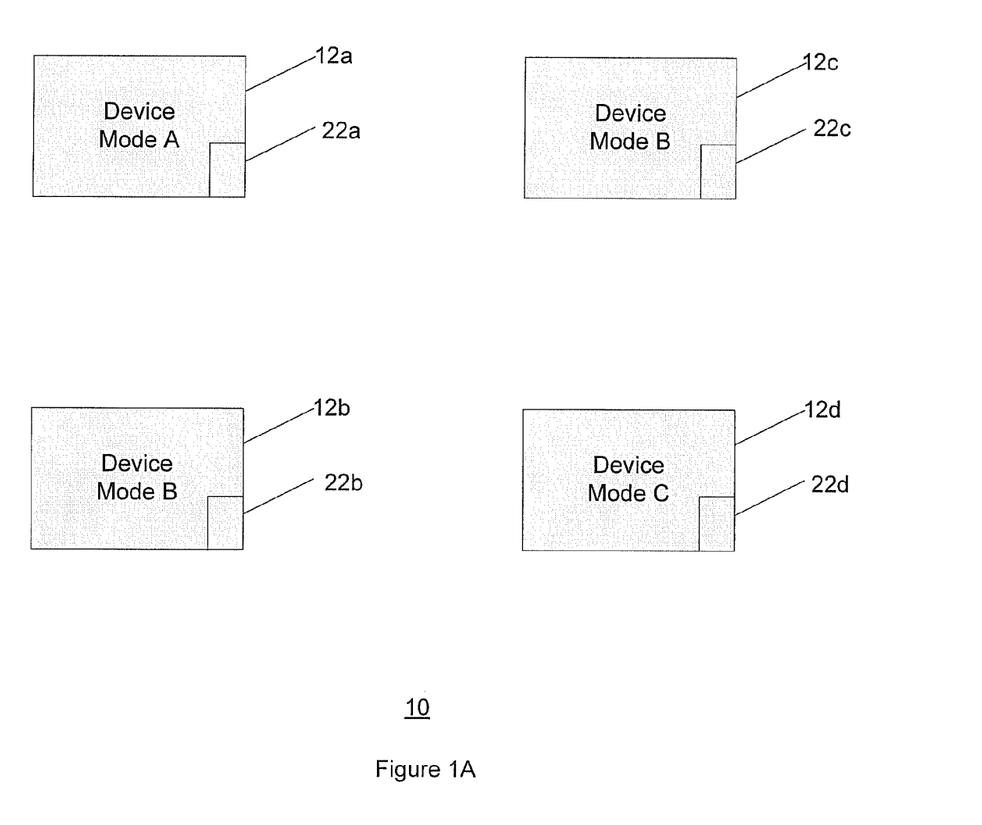
FIG. 1A is a block diagram of an embodiment of an autonomous wireless system in accordance with an embodiment.

An autonomous system and method is provided that allows for a user in a wireless environment to communicate with other devices in that environment by directly utilizing a direct link to communicate between the devices. FIG. 1A is a block diagram of an embodiment of an autonomous wireless system 10 in accordance with an embodiment. The system 10 includes a plurality of devices 12a-12d. Each device 12a-12d includes a wireless interface 22a-22d respectively. In addition, the device is in a partial operating mode (Mode A device) and the two devices 12b and 12d are in a full operating mode (Mode B), and device 12d is operational in an invitational mode (Mode C devices). It should be understood that although four devices 12a-12d are shown in the system 10 there can be any number of devices that include the wireless interfaces and their use would be within the spirit and scope of the present invention.

Figure 1B:
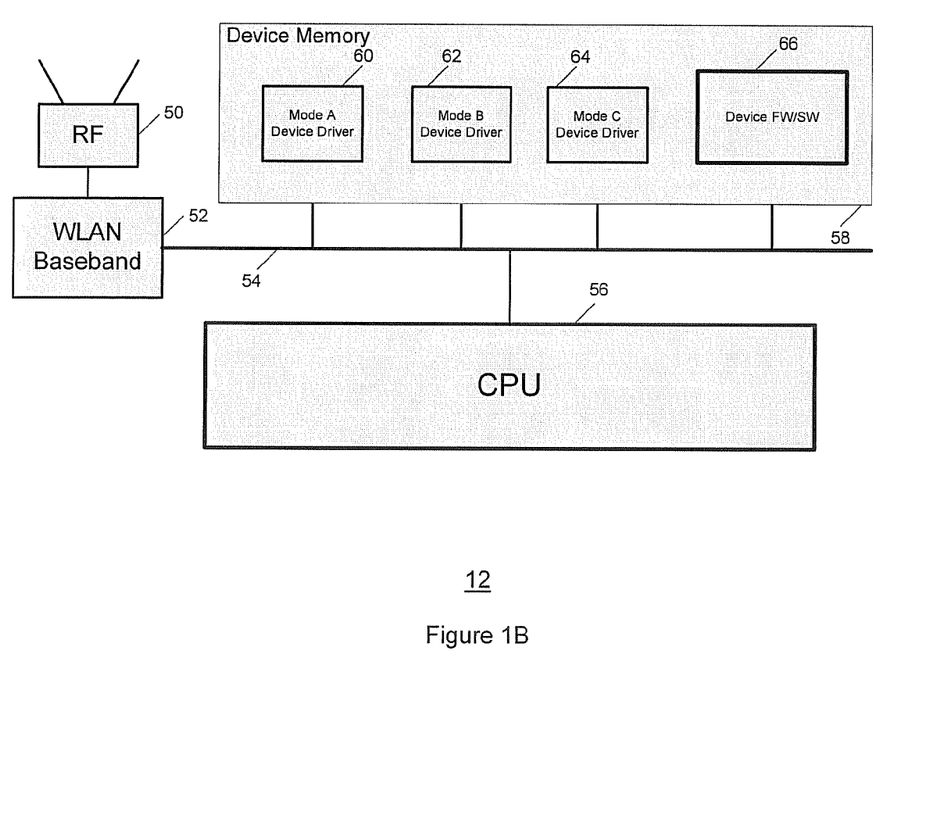
FIG. 1B is a block diagram of an embodiment of a device utilized in the system in FIG. 1.

FIG. 1B is a block diagram of an embodiment of a device 12 utilized in system 10. The device 12 includes a RF antenna 50 coupled to a wireless LAN baseband transceiver 52. The transceiver 52 is coupled to a bus 54. The bus 54 is coupled between a central processing unit 56 and device memory 58. The device memory 58 includes a plurality of modules or device drivers 60-64.

Each of these drivers when enabled allows the device 12 to operate in a different way. For example, driver 60 when enabled allows for the device 12 to operate in a partial mode (Mode A device), 62 when enabled allows for the device 12 to operate in a full mode (Mode B device) and driver 64 when enabled allows for the device 12 to operate in an invitational mode (Mode C device). These different modes will be described in more detail later in this specification. The device 12 also includes a firmware/software module 66 for operating the device 12.

This type of system 10 is very effective in allowing for exchanging of messages and communication between users in a variety of environments. The communication is accomplished via a direct link between the wireless interfaces 22a-22d of the respective devices.

For example, if this type of functionality was enabled within devices it would allow for instantaneous introduction of one person to another in a particular environment. That environment could be a meeting where most of the individuals are attending. There is a desire to either know who is there, or to communicate with specific individuals who may be there in a more direct way. Such a system would allow for the exchange of information in a more effective manner than heretofore.

In another environment, such as selling a product, this autonomous wireless system could be utilized to promote the product and describe sales of such products via the enabling technology. This functionality would also be effective for use in a meeting particularly where an individual is giving a lecture, whether it be in a classroom or in a conference. The lecturer could push information to the people who are attending the lecture so that they might download files, for example, from his laptop directly into the students' devices.

Finally, this system could be used, for example, for emergency purposes, such as a child or an elderly person being lost. If they have this device, their not being where they are supposed to be could be broadcast or sent via links to each of the systems which are enabled. Accordingly, the system has a variety of types of information/environments that could be exchanged. Some of those are listed below.

Types of information that could be exchanged include, but are not limited to, business cards, personal information, sales promotion, announcements of entertainment events, sales or sporting events, a trade show or public gathering, news flashes, and emergency or alert messages, etc.

A system that utilizes an autonomous wireless system in accordance with the present invention can take the form of an implementation of entirely hardware, entirely software, or may be an implementation containing both hardware-based and software-based elements. In one implementation, this disclosure is implemented in software, which includes, but is not limited to, application software, firmware, resident software, program application code, microcode, etc.

Furthermore, the autonomous wireless system of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Configurations

A system and method in accordance with the present invention can be used on any devices that are equipped with a WLAN interface, which includes laptops, desktops, and handheld devices such as cell phones, video phones, as well as devices that include video display units, etc. Users have a choice of setting their device in partial or full operation mode depending on whether the device is placed in receive mode with limited transmission or in full receive and transmission mode, respectively. To describe these modes in more detail refer now to the following description in conjunction with the accompanying figures.

Partial Mode Operation

Figure 2:
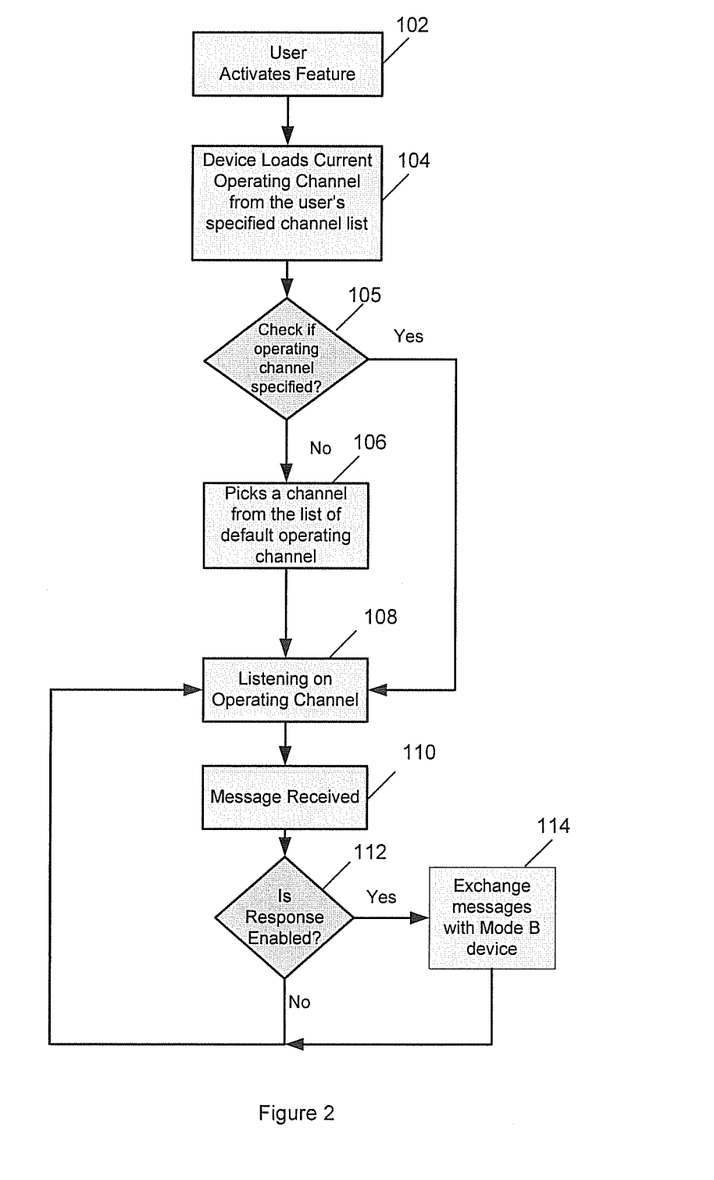
FIG. 2 is a flow chart for the device of FIG. 1B when operating in a partial mode (Mode A device).

FIG. 2 is a flow chart for a device of FIG. 1B when operating in a partial mode (Mode A device). First, the user activates the feature, via step 102. The device then loads the current operating channel from the user's specified channel list, via step 104. For example, in the U.S., there are 11 channels in the 2.4 GHz and 24 channels in 5 GHz frequency bands. The default operating channel list for 2.4 GHz band contains channels numbered 1 to 11. The default operating channel list for 5 GHz band contains channels numbered 36, 40, 44, 48, 52, 56, 60, 64, 149, 153, 157, 161, 100, 104, 108, 112, 116, 120, 124, 128, 132, 136, 140, 165 (Reference IEEE Std 802.11-2007).

The user checks to see if the operating channel is specified, via step 105. If yes, the user listens in on the operating channel, via step 108. If no, then the user randomly picks a channel from a list of default operating channels, via step 106. The user then can listen to the operating channel from the list of operating channels, via step 108.

Thereafter, a message is received, via step 110. Next, it is determined if a response is enabled, via step 112. If a response is enabled, via step 112, then messages are exchanged with a device operating in full mode (Mode B Device), via step 114. If a response is not enabled, then the user returns to listening on the default operating channel, via step 108.

The user of the device can then select the categories of messages that the device would accept or discard. The categories may include business, personal, public information, alert messages, etc. The default setting is to accept all messages. The user also selects whether the device will respond to certain types of messages that request information. The user may select a standard response to all receiving messages or specific responses to certain types of messages received.

Full Mode Operation (Mode B Device)

Figure 3:
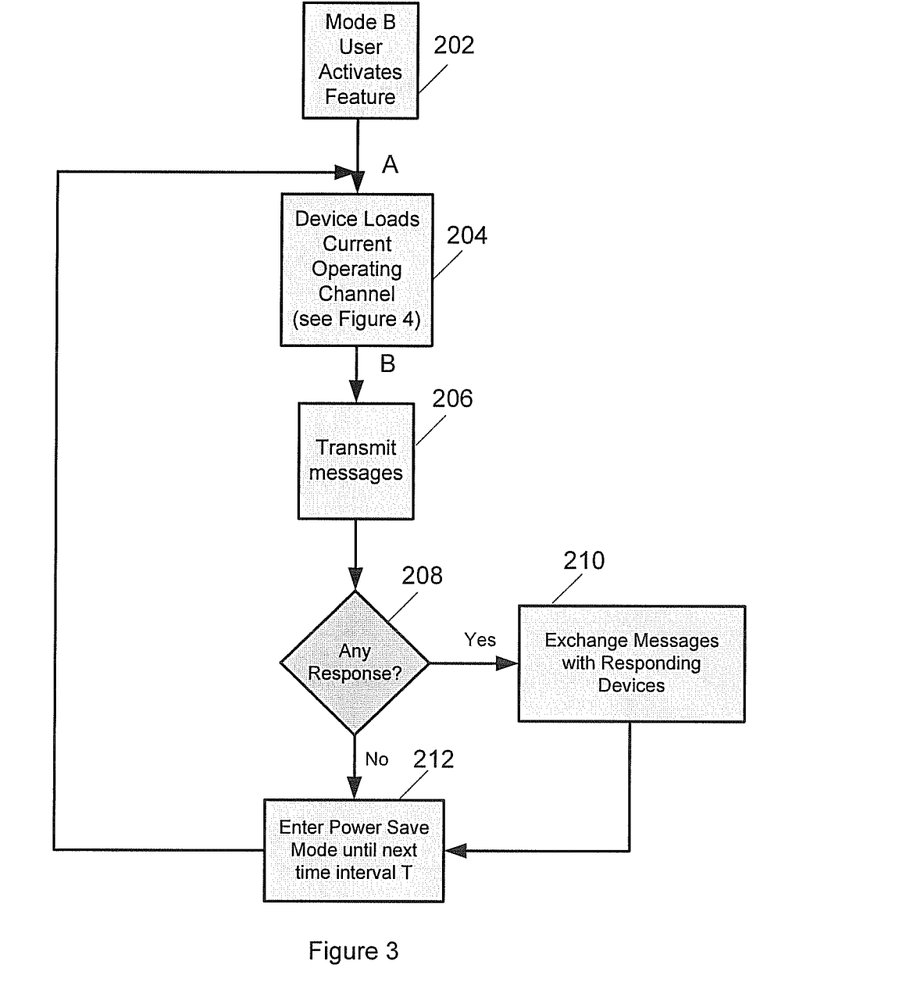
FIG. 3 is a flow chart for the device of FIG. 1B when operating in a full mode (Mode B device).
Figure 4:
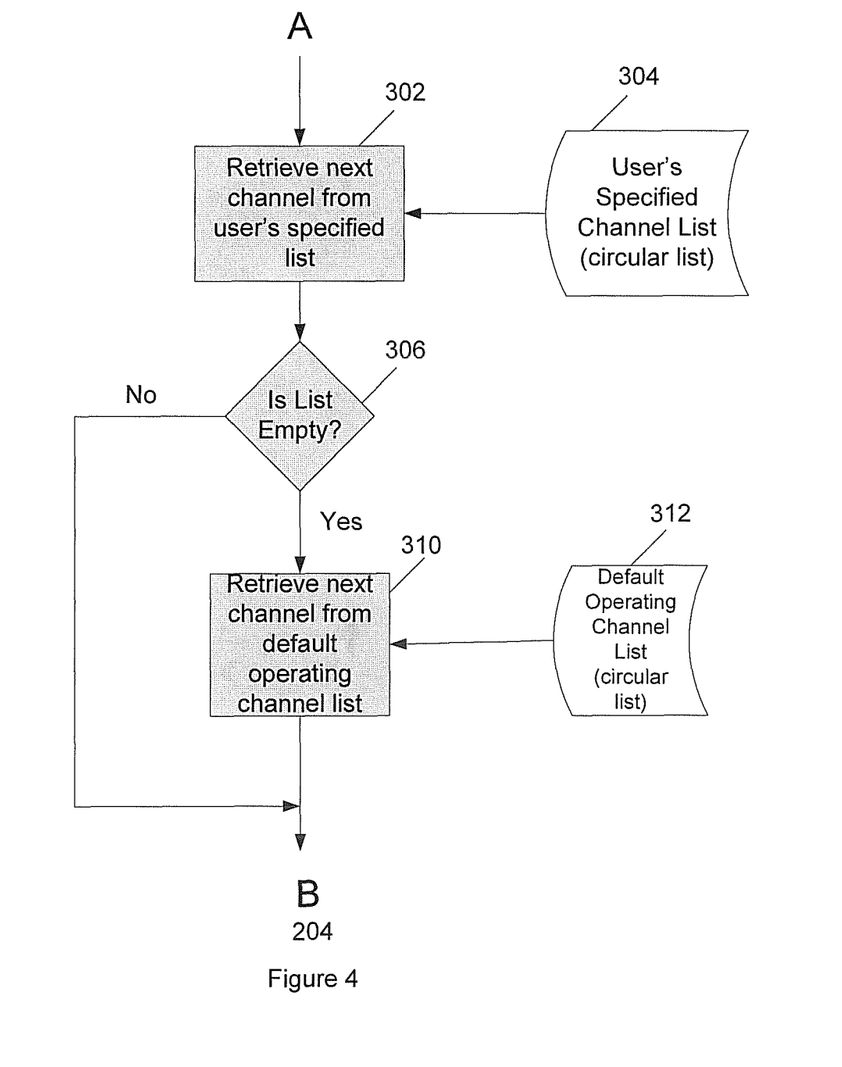
FIG. 4 represents a more detailed flow chart of loading the operating channel of FIG. 3.

FIG. 3 is a flow chart for the device of FIG. 1B when operating in a full mode (Mode B device). First, the user of the Mode B device selects or programs the message(s) to be transmitted and activates the feature, via step 202. The device then loads the current operating channel, via step 204. FIG. 4 represents a more detailed flow chart of loading the operating channel, via step 204, of FIG. 3.

Referring now to FIG. 4, the device retrieves a next channel from a specified list of the user, via step 302. In an embodiment the channel list comprises a circular list 304. Next, the device determines if the list is empty, via step 306. If the list is populated, then the device transmits a message, via step 206, of FIG. 3. If the list is empty, then a next channel is retrieved, via step 310, from a default operating channel. In an embodiment the default operating channel list comprises a circular list 312.

Referring back to FIG. 3, after the operating channel is loaded, the selected or programmed messages are transmitted from the device, via step 206.

The user specifies one or more operating channels for the device to transmit messages. If the user does not specify any channel, the device will use all channels in the default operating channel list. The Mode B device then waits for a response, via step 208. If there is a response, via step 208, then messages are exchanged with the responding devices, via step 210.

If there is no response, via step 214, then the device goes into the Power Save Mode until the next time interval T, via 212. The user selects the time interval (T) that determines how often the device transmits messages. The default value of T is set to a large value (5 to 10 seconds) to assume that all devices are stationary. The value of T should be reduced to a smaller value to increase coverage if devices are moving around.

When the time interval T appears, the device returns to load the next operating channel from the user's specified list, via step 204, or from the default channel list if the user's specified list is empty. Note that both of these lists are circular lists, meaning that after the last entry is retrieved, the next channel to be received is the first channel from the list. The time T can be set to a large value to save power or when both Node A and B devices are stationary, or are not moving too far apart from each other over a long period of time.

Full Mode Operation with Invitational Messages (Mode C Device)

Figure 5:
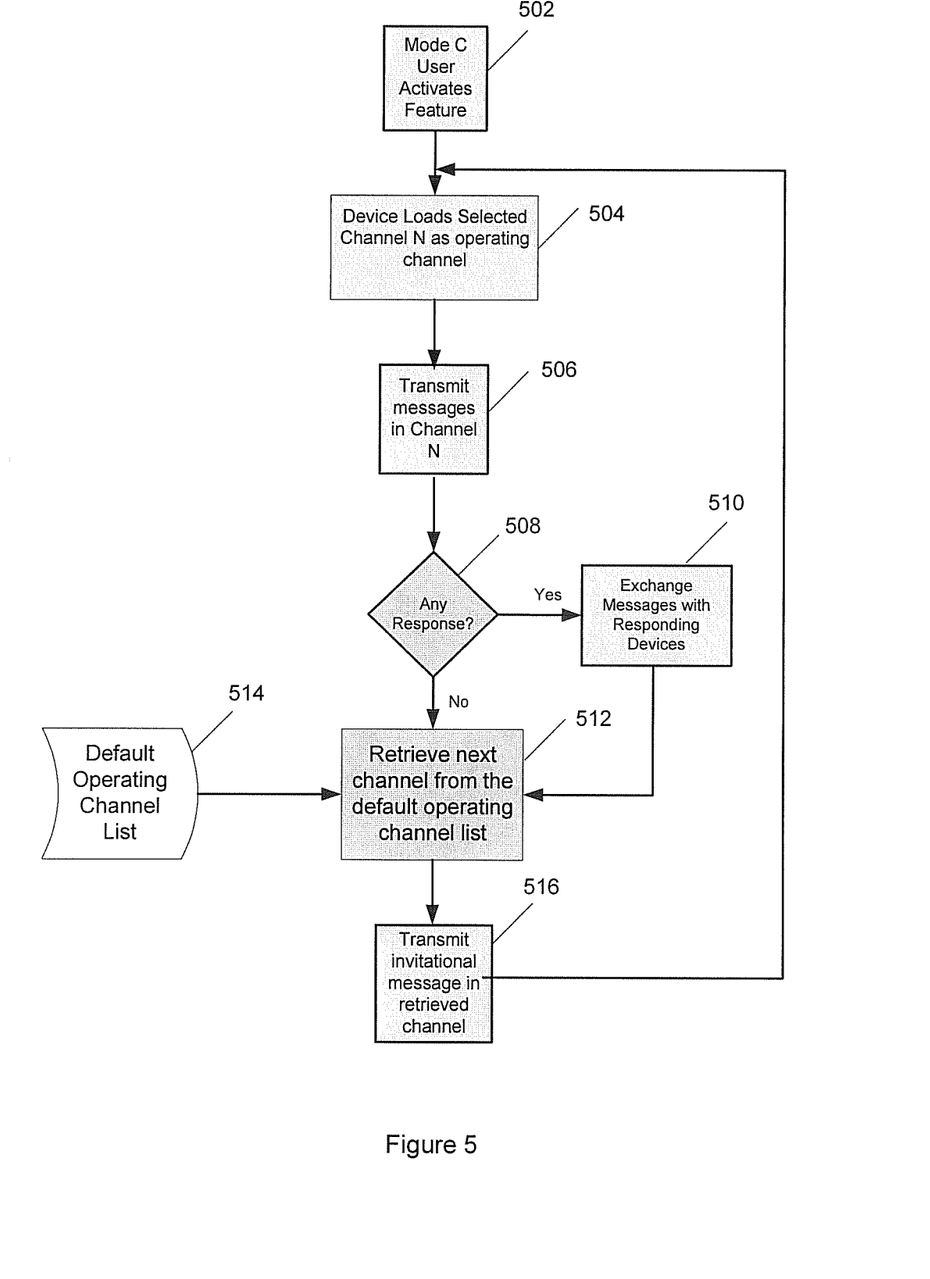
FIG. 5 is a flow chart for the device of FIG. 1B operating in one channel when sending invitational messages in other channels (Mode C device).

In another mode of operation, Mode C devices can be programmed to transmit on one particular channel and send invitations to other devices on all other channels to join it in its operating channel (see FIG. 5).

FIG. 5 is a flow chart for the device of FIG. 1B operating in one channel and sending invitational messages in other channels (Mode C device). The user of a Mode C device programs messages for transmission, specifies the channel N for transmission, selects option for sending invitational message and picks a value for the time Internal T (optional). First, the Mode C User activates feature, via step 502. The device then loads selected channel N as operating channel, via step 504. The device then transmits messages in Channel N, via step 506 and wait for a response. If there is a response, the device exchanges messages with responding devices, via step 510. After responding to all devices operating in Channel N, the device retrieves the next channel from a default operating channel list, via step 512. In an embodiment the default operating list comprises a circular list. The device then transmits an invitational message in the retrieved channel, via step 516. The device then returns to step 504.

There are many applications that can use the techniques described in the present invention to expand their coverage. Some applications that can be implemented to use the techniques are described below.

Application 1: At Trade Shows and Conferences

Sales materials, brochures, business addresses, contact information, and presentation materials at trade shows and conferences can be exchanged electronically without physically passing business cards or printed materials.

When people approach a display at a trade show, they can activate their cell phone or handheld devices such as iPOD, Zune etc. to receive messages, sale coupons, etc., from the exhibitor's cell phone or laptop device (Mode B device). The messages are then stored on their cell phones or iPOD with a time stamp so that people can trace back their visit later. Also if their cell phone has a built-in camera, they can take pictures and associate the information from the exhibitor with the pictures they have taken.

At conference meetings, the presenter can program his/her cell phone or laptop to be the Mode B device, frequently sending out the presentation information in all frequency channels. Alternatively, the presenter may choose to program his or her device to be the Mode C device to operate in one particular channel and the device routinely sends out invitations to Mode A devices in other channels to entice them to switch to the selected channel to get the presentation materials.

Application 2: In Shopping Malls, and in Indoor/Outdoor Sales Events

Shoppers get sales announcements, discount coupons, time of sales, and instant sales events as they walk around the mall with their cell phones or handheld devices turned on. They can also, for example, receive messages regarding children who may be missing, and other alert messages. There is also a possibility, for example, that one channel might be devoted to health, wellness and other alert messages within a mall.

Application 3: Alert Messages

Users can use their cell phones or handheld devices to transmit emergency or alert messages when they come within the operating range of other Mode A devices.

Application 4: Exchange Information with Other Car Drivers During a Traffic Jam, or with People in Public Places Such as Restaurants or Sporting Events Users of cell phones or handheld devices can use the feature to make new acquaintances or look for people with common interests.

Application 5: At the Airport or in Public Places, People can Use the Cell Phones or Handheld Devices to Share Songs, Pictures, and Knowledge of Places they are Traveling to, for Example, so that the Device(s) can Help Create Temporary Communities.

Conclusion

Methods and apparatus for two or more devices equipped with wireless local area network (WLAN) interface to communicate and exchange selected information are disclosed. Accordingly, a system and method in accordance with the present invention enables a handheld, laptop, smartphone or the like, which is equipped with a WLAN interface, to communicate and exchange business contact, sales brochures, event announcements, presentation materials, alert messages, etc., to other devices that include a WLAN interface.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A device for use in an autonomous wireless environment comprising:
   a wireless interface;
   wireless local area network (WLAN) baseband transceiver, coupled to the wireless interface;
   a central processing unit (CPU) coupled to the WLAN baseband transceiver via a bus; and
   a memory coupled to the bus; the memory including a plurality of software modules; wherein the plurality of software modules include a first software module for causing the device to operate in a partial mode when executed by the CPU; in which the device listens for messages via the wireless interface; a second software module causing the device to operate in a full mode when executed by the CPU in which the device communicates and exchanges messages with other devices directly via the wireless interface, wherein the executed second software module comprises programming a message to be transmitted from the device; activating the mode; loading the current operating channel; transmitting the message; exchanging messages directly with other devices via a wireless interface therebetween if there is a response; and entering into a power saving mode if there is no response for a predetermined time interval, wherein the loading the current operating channel comprises retrieving a next channel from a specified list of the user, transmitting the message if the specified list is populated; retrieving a next channel from a default channel operating list if the user specified list is empty; and transmitting the message; and a third software module causing the device to operate in an invitation mode when executed by the CPU in which the device provides invitational messages to other devices directly via the wireless interface.

2. The device of claim 1; which the executed second software module includes loading a next operating channel from a list after the predetermined time interval and repeating the programming; exchanging and entering steps.

3. The device of claim 1; wherein the user specified list and the default channel operating list comprise first and second circular lists.

4. The device of claim 1; wherein the messages are business card and personal information, announcements of sales events, sales discount coupons, brochures of company's products, contact names, presentation materials from the presenter, or requests for help or any types of alert messages.

5. The device of claim 1; wherein the executed third software module comprises:
   programming a message to be transmitted from the device;
   selecting one particular channel N to transmit on;
   activating the mode with invitation messages to be transmitted on;
   loading the current operating channel;
   transmitting an invitation message; and
   returning to the selected channel N.

6. The device of claim 5 in which the executed third software modules includes loading a next operating channel from a list after the predetermined time interval; transmitting an invitation message and returning to the selected operating channel N.

7. The device of claim 6; wherein the invitation message is business card and personal information, announcements of sales events, sales discount coupons, brochures of company's products, contact names, presentation materials from the presenter, or requests for help or any types of alert messages.

8. The device of claim 1; wherein the executed first software module comprises:
   loading a current operating channel from a specified channel list; and
   receiving a message on the current operating channel directly from another device via a wireless interface.

9. The device of claim 8; which includes exchanging the message with a device operating at full mode.

10. The device of claim 9; wherein the messages contain business card and personal information, announcements of sales events, sales discount coupons, brochures of company's products, contact names, presentation materials from the presenter, or requests for help or any types of alert messages.

11. The device of claim 1; wherein the executed first software module comprises:
   selecting the categories of messages that the device would accept or discard upon receiving;
   programming a standard response to all messages received;
   programming a specific response to all messages received; and
   programming specific response according to the categories of messages received.

12. The device of claim 11; wherein the messages contain business card and personal information, announcements of sales events, sales discount coupons, brochures of company's products, contact names, presentation materials from the presenter, or requests for help or any types of alert messages.

13. A method for autonomous wireless connection of a wireless device, the wireless device comprises a wireless interface, the method comprising:
   receiving an instruction; and
   performing one of a plurality of communication steps according to the instruction, wherein the plurality of communication steps comprise,
   providing a plurality of software modules; wherein the plurality of software modules include a first software module for causing the device to operate in a partial mode when executed by a CPU; in which the device listens for messages via the wireless interface; a second software module causing the device to operate in a full mode when executed by the CPU in which the device communicates and exchanges messages with other devices directly via the wireless interface, wherein the executed second software module comprises programming a message to be transmitted from the device; activating the mode; loading the current operating channel; transmitting the message; exchanging messages directly with other devices via a wireless interface therebetween if there is a response; and entering into a power saving mode if there is no response for a predetermined time interval, wherein the loading the current operating channel comprises retrieving a next channel from a specified list of the user, transmitting the message if the specified list is populated; retrieving a next channel from a default channel operating list if the user specified list is empty; and transmitting the message; and a third software module causing the device to operate in an invitation mode when executed by the CPU in which the device provides invitational messages to other devices directly via the wireless interface.

* * * * *